United States Patent Office 2,900,224
Patented Aug. 18, 1959

2,900,224
METHOD FOR PREPARING SODIUM ALUMINUM HYDRIDE

Alfred Armond Hinckley and Frank Paul Del Guidice, Beverly, Mass., assignors to Metal Hydrides Incorporated, Beverly, Mass., a corporation of Massachusetts No Drawing. Application November 30, 1954
Serial No. 472,232

1 Claim. (Cl. 23—14)

This invention relates to a method for preparing sodium aluminum hydride having the formula $NaAlH_4$.

The United States patent to Schlesinger and Finholt No. 2,567,972 describes a method for preparing metal aluminum hydrides having the formula $M(AlH_4)_v$ wherein M is a metal of the class consisting of alkali metals and alkaline earth metals and $v$ is a number designating the valence of said metal. The method comprises reacting an aluminum halide with an excess of an alkali metal hydride or an alkaline earth metal hydride and in the presence of a suitable solvent for the metal aluminum hydride.

Lithium aluminum hydride ($LiAlH_4$) of high purity and high yield has been prepared commercially for several years by the above method using lithium hydride and aluminum chloride in diethyl ether. However, the above method has not been found satisfactory for the preparation of sodium aluminum hydride. Sodium aluminum hydride has been prepared by the action of sodium hydride on aluminum bromide using dimethyl ether as a solvent. However, this procedure has disadvantages. The relatively expensive aluminum bromide has to be used since results with aluminum chloride are unsatisfactory and the yields even with the bromide do not exceed 60 to 65%. In addition, the high volatility of the dimethyl ether necessitates the use of pressure equipment. Sodium aluminum hydride has also been prepared using aluminum chloride in the presence of tetrahydrofuran but the results have also been unsatisfactory because the reaction is erratic, sometimes giving small yields of the desired product and at other times the desired product is not obtained; and because the products obtained are also low in purity. It has been attempted to overcome these difficulties by the use of a catalyst, such as lithium chloride, but these attempts have not been successful.

A method has recently been proposed by which the above mentioned difficulties may be overcome in the preparation of sodium aluminum hydride. This method is described in a copending application of Albert E. Finholt Serial No. 404,396, filed January 15, 1954, and is a two-step process which is illustrated by the following equations in which X is a halide:

(1) $3NaAlH_4 + AlX_3 \rightarrow 4AlH_3 + 3NaX$ (2) $4AlH_3 + 4NaH \rightarrow 4NaAlH_4$ By this method four moles of sodium aluminum hydride are obtained from three moles. In carrying out this method a portion of the increased amount of sodium aluminum hydride obtained may be retained for other purposes and the remainder may be recycled for making still more sodium aluminum hydride. To begin the cycle, an initial amount of sodium aluminum hydride is required. This initial amount may be obtained from the easily prepared and commercially obtainable lithium aluminum hydride as shown by the following equations:

(3) $3LiAlH_4 + AlX_3 \rightarrow 4AlH_3 + 3LiX$ (4) $4AlH_3 + 4NaH \rightarrow 4NaAlH_4$ Once the cycle is started, further use of lithium aluminum hydride is unnecessary since thereafter the sodium aluminum hydride prepared from the lithium salt can be used to produce further amounts of sodium aluminum hydride.

The metal aluminum hydrides may be employed for the reduction of organic compounds. A particular advantage of the metal aluminum hydrides for the reduction of organic compounds is their specificity, as illustrated by the fact that functional groups of an organic compound, which often contains a carbon to carbon double bond, may often be reduced without affecting the double bond. Lithium aluminum hydride has been the only metal aluminum hydride available commercially. When this salt is used in organic reactions in some organic solvents, a soluble lithium salt is present as an impurity and is difficult to separate from the final product. Sodium salts, on the other hand, are not usually harmful in organic reactions as they are insoluble. It is highly desirable, therefore, to provide a satisfactory method by which sodium aluminum hydride may be produced economically on a commercial scale.

We have discovered that high yields of sodium aluminum hydride of high purity can be obtained by reacting sodium hydride directly with an aluminum halide, such as aluminum chloride or bromide, in a suitable solvent if the sodium hydride used is obtained by preparing a dispersion of sodium hydride in oil.

Sodium hydride suitable for use in the practice of the present invention may be prepared by the method described in the copending application of Mario D. Banus and Robert C. Wade Serial No. 374,106, filed August 13, 1953, now abandoned. By this method sodium metal and oil or other inert liquid hydrocarbon, with or without dispersing and hydriding accelerating agents, may be placed in a suitable agitator and heated at a suitable temperature for hydriding, such as between about 200° C. and 350° C., in the presence of hydrogen at atmospheric pressure or considerably higher. Agitation is continued until absorption of hydrogen ceases. Any agitator may be used, such as a turbine agitator, which is capable of breaking up the molten sodium metal into finely divided particles. Good results also have been obtained with a high-speed stirring device known as the Premier Dispersator. The inert hydrocarbon liquid should have a boiling point greater than the temperature used in producing the sodium hydride dispersion and which is substantially free of unsaturated components and which has a viscosity of the order of that of lubricating oils. Illustrative examples of suitable inert liquids are "Nujol," "Primol D" which is a refined high-boiling Esso mineral oil, and "Bayol 85" which is an Esso mineral oil not as highly refined as "Nujol" or "Primol D."

In preparing sodium aluminum hydride by the method of the present invention the solvent medium used may be any solvent for sodium aluminum hydride which also is a solvent for the aluminum halide compound used. Certain aluminum halides, such as aluminum chloride, tend to react with certain solvents for sodium aluminum hydride, such as tetrahydrofuran. This difficulty can be avoided by using the aluminum halide in the form of an etherate. Thus, when aluminum chloride and tetrahydrofuran are used, the aluminum chloride may be used in the form of a solution in a small amount of diethyl ether to form the etherate.

In carrying out the method of the invention, the sodium hydride may be introduced into a suitable reaction vessel in the form of a dispersion in the inert liquid hydrocarbon in which it was prepared or it may be first separated from the liquid hydrocarbon. The aluminum halide and the solvent then may be introduced in that sequence. It is preferred to introduce the sodium hydride and the solvent into the reaction vessel and then add the aluminum halide as a solution. It is also preferred that the air be displaced from the reaction vessel by an inert gas such as dry nitrogen. This is not essential, however, since the reaction can be carried out in air of ordinary humidity. To hasten the reaction a small amount of sodium aluminum hydride may be introduced as a seed.

The invention is illustrated further by the following specific example. 61.69 grams of aluminum chloride dissolved in about 150 ml. of diethyl ether was added to a mixture of 444 grams of tetrahydrofuran, 240 grams of sodium hydride dispersion in oil containing 21.1% sodium hydride, and 2.26 grams of sodium aluminum hydride over a period of 45 minutes in a flask fitted with a reflux condenser. Vigorous refluxing of the solution during this time indicated that a reaction was taking place. Refluxing stopped immediately after all the aluminum chloride had been added. The solution was cooled and centrifuged to remove sodium chloride and excess sodium hydride. After washing and drying, the precipitate was found to be substantially sodium chloride with a small amount of sodium hydride. The centrifugate was transferred to a distillation flask where the tetrahydrofuran and diethyl ether were distilled off in an inert atmosphere. This caused precipitation of sodium aluminum hydride from the oil. The oil was removed by diluting with ether and filtering. When the precipitate was dried it was found to be sodium aluminum hydride of 92.4% purity and in a 78% yield.

We claim:

The method for preparing sodium aluminum hydride which comprises reacting aluminum chloride and sodium hydride in tetrahydrofuran, and recovering the product, the aluminum chloride used being in the form of an etherate of diethyl ether, said sodium hydride having been prepared by hydriding a dispersion of sodium metal in an inert liquid hydrocarbon.

References Cited in the file of this patent

UNITED STATES PATENTS

| 1,958,012 | Muckenfuss | May 8, 1934 |
| 2,576,311 | Schlesinger et al. | Nov. 27, 1951 |
| 2,720,444 | Banus et al. | Oct. 11, 1955 |

FOREIGN PATENTS

| 707,851 | Great Britain | Apr. 21, 1954 |

OTHER REFERENCES

Finholt et al.: "Journal of the American Chemical Society," vol. 69, pages 1199–1203, May 1947.

Schlesinger et al.: "Hydrides and Borohydrides of Light Weight Elements and Related Compounds," Final Report for the period July 1, 1949–July 31, 1950, on contract N 6ori; T.O.X. pages 6 and 7 of Progress Report XXXVIII, page 3 of Progress Report XXXV.